June 7, 1949.                M. R. HARTNELL                2,472,296
                              SOLDERING IRON TIP
                              Filed Oct. 12, 1946
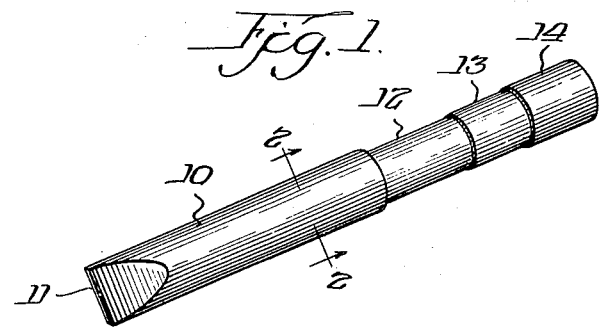
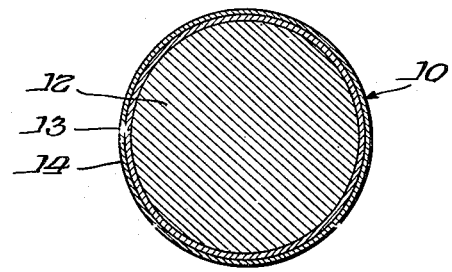
Inventor:
Merton R. Hartnell,
By Wilkinson Huxley Byron & Knight
                                    Attys.

Patented June 7, 1949

2,472,296

UNITED STATES PATENT OFFICE 2,472,296

SOLDERING IRON TIP

Merton R. Hartnell, Chicago, Ill.

Application October 12, 1946, Serial No. 702,889

1 Claim. (Cl. 113—105)

My invention relates to a tip for use in soldering irons and has particular reference to a soldering tip, the body portion of which is made preferably of copper with a nickel coating upon which a further coating of rhodium is superimposed.

Another and further object of my invention is the provision of a tip for soldering irons which has better non-oxidation qualities than tips which have been heretofore used, thereby enabling the tip to have much longer life than is common with the ordinary copper tip now in general use.

Another and further object of my invention is to produce a soldering tip which has very high acid resisting qualities, so much so that the acid from the flux used in soldering has little or no effect upon the tip, thereby resulting in a soldering tip which has a much longer life than the copper tips now commonly used and in which the tips are preserved so they retain their form for use for soldering purposes and do not require the amount of dressing which is commonly employed in the copper tips for soldering irons now in use.

Another and further object of my invention is the provision of a tip for soldering irons which has a great resistance to oxidation, as well as to the acid corrosion produced during the soldering operation. The tip can be readily removed from the soldering iron for renewal or for an occasional dressing of the point, as may be necessary because they do not freeze into the soldering iron, which is now common with the tips now in use unless these tips are removed frequently and dressed to remove the oxidized material. When the tips become frozen in the soldering iron the heating element as well as the soldering tip of the iron is rendered unfit for further use and must be destroyed. When this oxidation is prevented, the efficiency of the tip and soldering iron is retained.

Another and further object of my invention is the provision of a soldering tip which by reason of the rhodium plating has a particular affinity for soldering material and becomes tinned very easily and quickly as it is used in the soldering operations and which does not require any special preparation for use in soldering operations.

These and other objects of my invention will be more fully and better understood by reference to the accompanying sheet of drawings and in which:

Figure 1 is a perspective view of a tip for soldering irons broken away to show the three materials used; and Figure 2 is an enlarged cross-section on line 2—2 of Figure 1.

Referring now specifically to the drawings and in which like reference characters refer to like parts throughout, a soldering tip 10 is shown having a body portion or central core 11 preferably of copper upon which a nickel coating 13 is placed preferably by plating, over which a rhodium coating 14 is placed preferably by plating.

The rhodium coating gives the tip an exceedingly high resistance to acid corrosion, and I prefer to use it over a nickel base in order to reduce the cost of production, although a rhodium coating upon the copper body will produce equally good results, but because of the expense involved in applying the rhodium, I find it more desirable to place it over the coating of nickel by a plating operation. In the ordinary plating operation the coating of rhodium can be quickly and easily applied to the tip having a nickel coating, whereas if the rhodium coating is applied directly to the copper there is a certain amount of disintegration of the copper thereby rendering the rhodium bath unfit for other plating and finally the bath is so diluted that the plating operation cannot be controlled.

It will be understood, of course, that the tip as shown is the type known as the chisel end, but various forms and types of soldering tips—straight, curved, threaded, and the like—can be produced in exactly the same manner with equally good results in the use of the tip.

Due to the fact that the rhodium coating is applied to the entire surface of the tips, the tips do not oxidize and therefore do not freeze in the soldering iron and while the tips of the irons need dressing occasionally, the shanks or threads of the tips are not burned away by oxidation or eaten away by the acid of the flux used in the usual soldering process which results in the pitting of the tip, as well as a burning away of the metal ofttimes adjacent the point, so that the tips have to be dressed frequently and sometimes a section of the tip cut away and reshaped to properly perform its operation.

The shanks of the soldering tips are normally made for a close sliding fit in the heating iron, and if through oxidation the diameter of the shank is decreased the air around the shank forms an insulating agent resulting in slow heating of the tip due to the slow heat transfer from the iron to the tip as well as irregular heating and an occasional burning out of the heating element. If oxidation of the shank is prevented the heat transfer is quick and uniform and the operation of the soldering iron very much improved.

I have found that all of these difficulties have been overcome in my present type of soldering tip and further that the tip becomes tinned very easily and quickly, which is not the case with some other types of plating such as chromium and the like.

An alloy of nickel and rhodium may also be made and combined in a single coating, or other metals may be combined with rhodium, but in any event such an alloy or combination must possess a high rhodium content to successfully resist corrosion and oxidation.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What is claimed is:

A soldering iron tip comprising a copper core portion, a coating of nickel thereon and a coating of rhodium over the first mentioned nickel coating.

MERTON R. HARTNELL.

REFERENCES CITED

The following references are of record in the file of this patent:

UNITED STATES PATENTS

| Number | Name | Date |
|---|---|---|
| 1,947,180 | Bart | Feb. 13, 1934 |
| 2,252,443 | Shipley | Aug. 12, 1941 |

FOREIGN PATENTS

| Number | Country | Date |
|---|---|---|
| 522,615 | Great Britain | June 21, 1940 |